(12) United States Patent
Wright et al.

(10) Patent No.: US 7,021,631 B2
(45) Date of Patent: Apr. 4, 2006

(54) SEAL ARRANGEMENT

(75) Inventors: Christopher Wright, Bristol (GB); Karl W Shore, Birmingham (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 10/408,345

(22) Filed: Apr. 8, 2003

(65) Prior Publication Data
US 2003/0178779 A1 Sep. 25, 2003

Related U.S. Application Data

(63) Continuation of application No. 09/732,778, filed on Dec. 11, 2000, now Pat. No. 6,565,094.

(30) Foreign Application Priority Data
Dec. 16, 1999 (GB) .................................. 9929587

(51) Int. Cl.
*F16J 15/44* (2006.01)
(52) U.S. Cl. ................................................ 277/355
(58) Field of Classification Search .............. 277/355
See application file for complete search history.

(56) References Cited

U.S. PATENT DOCUMENTS 5,351,971 A * 10/1994 Short ........................ 277/355
6,079,945 A * 6/2000 Wolfe et al. ................ 415/231
6,565,094 B1 * 5/2003 Wright et al. ............... 277/355

* cited by examiner

*Primary Examiner*—Vishal Patel
(74) *Attorney, Agent, or Firm*—W. Warren Taltavull; Manelli Denison & Selter PLLC

(57) ABSTRACT

A brush seal (9) comprising a plurality of bristles packed together in a bristle layer (10). The bristles (10) extend from a first component (4) towards a facing surface of a second component (2). A movable plate (14) is disposed substantially parallel to and adjacent to the bristle layer (10). The plate (14) is movable relative to the bristle layer (10) in a direction parallel to the bristle layer (10). An edge (22) of the movable plate (14) adjacent to and facing the facing surface of the second component (2) is arranged to air ride on the facing surface of the second component (2). To promote the air riding the edge (22) of the movable plate (14) may be accordingly profiled. Alternatively the edge (14) may comprise an enlarged foot member (24) which defines an enlarged surface (26). Furthermore a recess (30) may be defined in the movable plate (14).

4 Claims, 3 Drawing Sheets

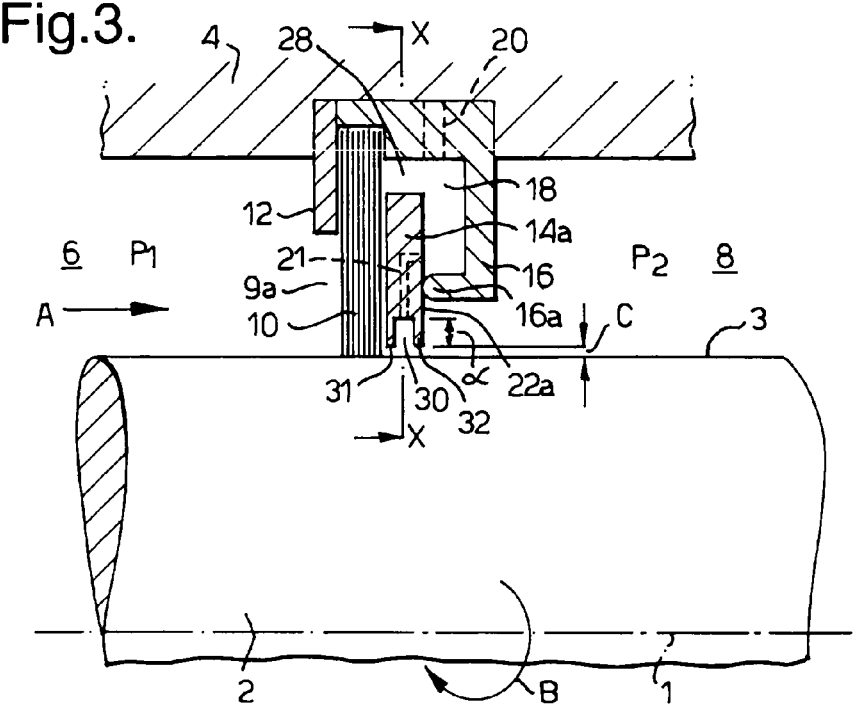
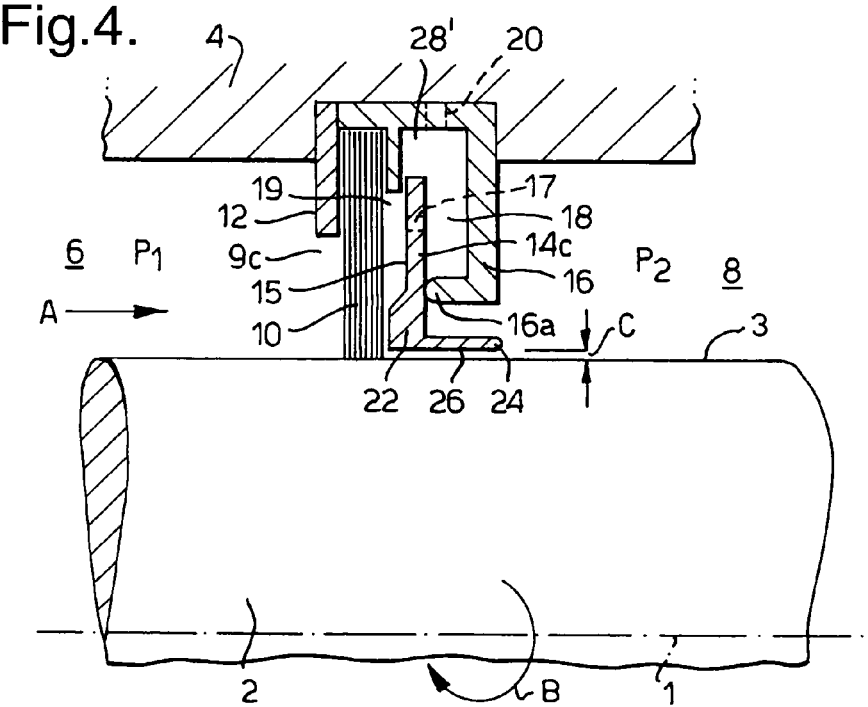

SEAL ARRANGEMENT

This is a continuation of National application Ser. No. 09/732,778 filed on Dec. 11, 2000, which is now a U.S. Pat. No. 6,565,094.

FIELD OF THE INVENTION

The present invention relates generally to fluid seal arrangements for sealing high pressure areas from low pressure areas and in particular to improvements to brush seals.

Brush seals have been developed for sealing high pressure regions from low pressure regions for, in particular, gas turbine engine applications where a seal is required between relatively movable parts, typically between rotor shafts and a stationary housing. The seal prevents or restricts leakage flow along the shaft. Such brush seals offer improved sealing as compared to conventional labyrinth type seals and can better accommodate radial movements of the shaft.

Brush seals comprise a layer of bristles which are sandwiched between annular front and backing plates which are mounted on and extend radially from the stationary housing surrounding the shaft. The backing plate typically extends radially further inwards towards the shaft than the front plate with the bristles extending yet further still with the bristle tips typically wiping against the surface of the shaft. Although the bristles provide a significant degree of sealing it has been found that the clearance between backing plate and the shaft has a significant effect on seal performance with smaller clearances reducing the leakage flow. However since, unlike the bristles, the backing plate is solid and fixed a minimum clearance between the backing plate and the shaft is required in order to accommodate anticipated radial movement of the shaft. Such movement is caused by thermal growth, centrifugal growth, eccentric mounting of the shaft, shaft vibration and transient movement due to loads on the shaft.

One proposal to address this problem and provide an improved seal is described in U.S. Pat. No. 5,351,971. In this proposal a radially movable backing plate is suggested which can move radially when contacted by the shaft in order to accommodate the anticipated radial movement of the shaft. Since the backing plate can now move radially a smaller clearance between the backing plate and shaft can be used as compared to a seal with a fixed backing ring and the seal performance can be improved.

BACKGROUND OF THE INVENTION

A problem however with this proposal is that the shaft must contact the backing plate in order to move the backing plate. Such contact will generate friction between the backing plate and the shaft even when non abrasive low coefficient coating are used, which will generate heat and will cause wear of the backing plate and/or shaft. Such wear increases the clearance between the backing plate and shaft which reduces the seal performance. Furthermore wear of the shaft will reduce its strength and may give rise to a stress concentration requiring the shaft to be prematurely replaced or in extreme cases could lead to shaft failure.

It is therefore desirable to provide an improved seal arrangement which addresses the above problems of contact between the backing plate and shaft whilst minimising the clearance therebetween to provide improved seal performance and/or which offers improvements generally.

According to the present invention there is provided a brush seal comprising a plurality of bristles packed together in a bristle layer with the bristles mounted on and extending from a first component towards a facing surface of a second component, and a movable plate disposed substantially parallel to the bristles and adjacent to the bristle layer, the plate being movable relative to the bristle layer in a direction parallel to the bristle layer; characterised in that the movable plate and an edge of the movable plate adjacent to and facing the facing surface of the second component are arranged to, in use, air ride on the facing surface of the second component.

Preferably the edge of the movable plate adjacent to the second component is profiled so as to promote air riding of the movable plate adjacent to the facing surface of the second component.

Alternatively the edge of the movable plate adjacent to the second component comprises an enlarged foot member which extends from the remainder of the movable plate so as to define an enlarged surface substantially parallel to and facing the facing surface of the second component.

Furthermore the plate recess walls may define a recess in the edge of the movable plate adjacent to the second component, with the recess defined in the movable plate having an open side facing the facing surface of the second component. A duct within the movable plate may interconnect the recess with a source of pressurised fluid and in operation supplier pressurised fluid to the recess. The depth of the recess may vary along the length of the edge of the movable plate adjacent to the second component.

SUMMARY OF THE INVENTION

Preferably the facing surface of the second component in the region facing the movable plate is sufficiently smooth so as to promote air riding of the movable plate.

A support plate may extend from the first component towards the second component, at least a portion of the support plate abutting the movable plate and supporting the movable plate in a position adjacent to the bristles. Preferably a first portion of the support plate is spaced from the movable plate with a second portion of the support plate extending towards and abutting the movable plate such that a chamber is defined between the support plate and the movable plate. A duct may interconnect the chamber with a source of pressurised fluid.

The movable plate is preferably segmented.

At least a portion of the movable plate adjacent to the bristle layer may be spaced from the bristle layer. A chamber may thereby be defined by between the movable plate and the bristle layer. Preferably, in use, pressurised fluid is arranged to be supplied to between a region between the movable plate and the bristle layer.

Preferably the first component is a stationary housing, the second component is a rotatable shaft and the movable plate is annular.

The movable plate may be disposed either downstream or upstream of the bristle layer.

BRIEF DESCRIPTION OF THE DRAWINGS

The present invention will now be described by way of example only with reference to the following figures in which:

FIG. 3 shows a schematic sectional view similar to that shown in FIG. 1 of a second embodiment of a seal arrangement according to the present invention;

FIG. 4 shows a schematic sectional view similar to that shown in FIG. 1 of a further embodiment of a seal arrangement according to the present invention;

DETAILED DESCRIPTION OF THE INVENTION

Figure 1:
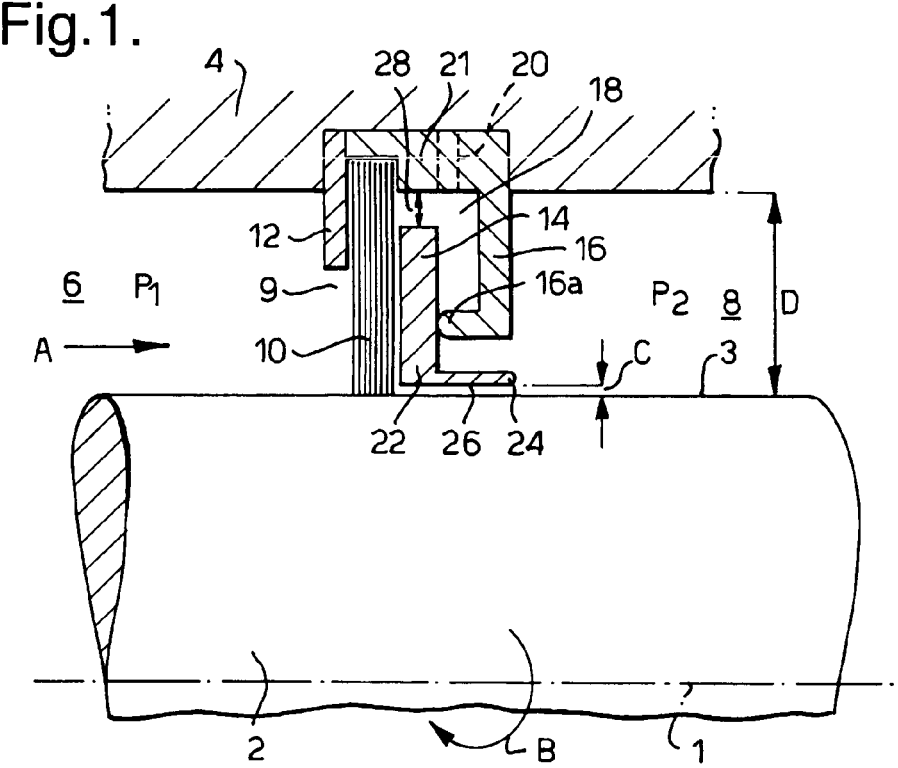
FIG. 1 shows a schematic sectional view of a seal arrangement according to the present invention.

Referring to FIG. 1 there is shown a seal 9 according to the present invention for sealing a gap D between a shaft 2 and a housing 4. The shaft 2 rotates, as shown by arrow B about an axis 1 within the stationary housing 4. The seal 9 segregates a first upstream region 6 at a pressure P1 from a second downstream region 8 at a lower pressure P2 and prevents or restricts a leakage flow of fluid along the shaft 2, in the sealing direction A from the higher pressure region 6 to the lower pressure region 8. It will be appreciated that the terms upstream and downstream are used throughout this description in relation to the direction A of leakage flow and sealing direction indicated by arrow A.

Figure 2:
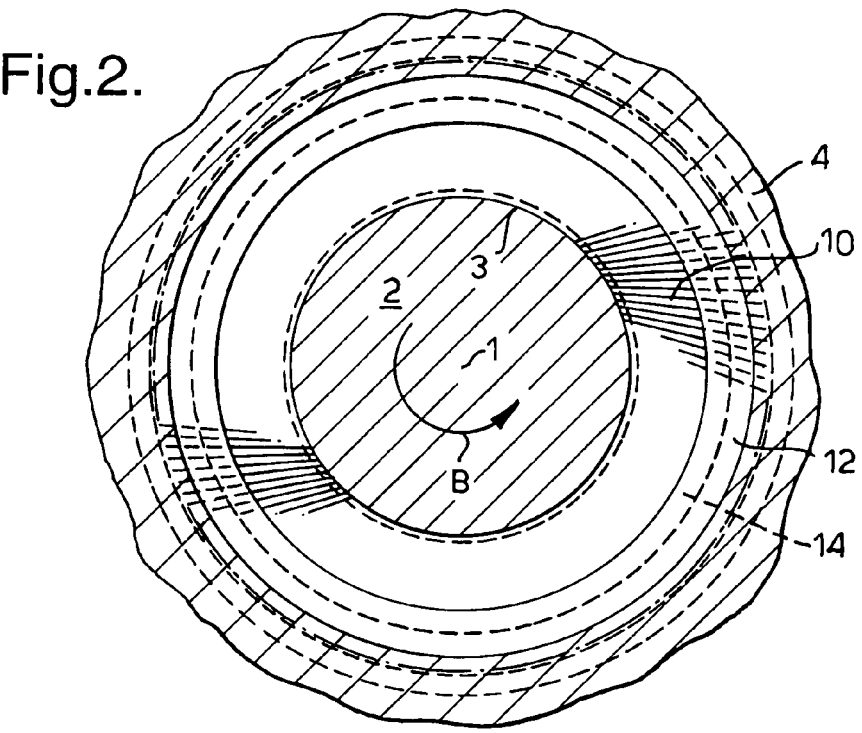
FIG. 2 shows a schematic sectional view in the sealing direction shown by arrow A of the seal arrangement shown in FIG. 1.

The seal 9 is of a brush seal type and comprises a plurality of metallic bristles 10 which extend from a seal body 21 located and attached to the stationary housing 4. The radially outward ends of the bristles are welded to the seal body 21 whilst the distil radially inward ends are arranged to just wipe against the outer surface 3 of the shaft 2. Alternatively the distil ends of the bristles 10 are in very close proximity to the shaft outer surface 3. The bristles 10 thereby seal the upstream region 6 from the downstream region 8 along the shaft 2. As shown in FIG. 2 the bristles 10 are disposed around the shaft 2 and inner bore of the stationary housing 4 and as known in the art, the bristles 10 are circumferentially angled in the direction of rotation B of the shaft 2. Typically the bristles 10 are angled at an angle of 45° to the radial direction.

Upstream of, and adjacent to, the bristles 10 is an annular front plate 12 which is attached to the seal body 21 and housing 4. The front plate 12 extends radially from the seal body 21 and housing 4 to a point radially part way along the radial length of the bristles 10.

Extending radially from the seal body 21 axially downstream of the bristles 10 is an annular support plate 16. A lip 16a extends axially from the radially inner distil end of the support plate 16 toward the bristles 10. An annular backing plate 14, which is disposed substantially parallel to the bristles 10, is sandwiched between the bristles 10 and the lip 16a with an upstream face of the backing plate 14 adjacent to the bristles 10. The backing plate 10 is movable in a radial direction relative to the lip 26, bristles 10 and seal body 21 whilst it is axially located and supported by the lip 16a and support plate 16. The lip 16a also has a curved profile to reduce the friction between the lip 16a and backing plate 14 to assist and permit radial movement of the backing plate 14. In addition to reduce friction a chamber or cavity 18 is defined by the lip 16a, support plate 16, and seal body 21. Preferably a duct 20, connected to a source of pressurised air (not shown), is provided in the seal body 21 to supply pressurised air to the cavity 18 and generate a cavity pressure therein. The cavity pressure is approximately equal to the upstream pressure P1 such that there is a small net force in the upstream direction on the backing plate to reduce the friction between the 16a lip and backing ring 14. The exact value of the cavity pressure is experimentally determined and the cavity pressure is fine tuned, i.e. raised or lowered so as to permit the required radial movement of the backing ring 14.

It will be appreciated however that a lip 16a need not be provided and the backing ring 14 could be simply sandwiched between an upstream face of the support plate 16 and the bristles 10. This however will increase the friction between the backing plate 14 and support plate 16 which may restrict, to some degree, the radial movement of the backing ring 14.

To facilitate radial movement of the backing plate 14 a clearance 28 is provided between the outer peripheral edge of the backing plate 14 and the seal body 21. The dimensions of the clearance 28 are such that the backing plate 14 can move sufficiently radially, in response to radial movement of the shaft 2, so that the inner periphery of the backing plate 22 will not contact the shaft outer surface 3. Radial movement of the shaft 2 is to be expected in operation due to runout and thermal bowing of the shaft 2, movement of the shaft 2 due to turning acceleration, shaft vibration, and eccentricity of the shaft 2 or seal 9 mounting with respect to the axis of rotation 1.

To inhibit rotational movement of the backing plate 14, whilst still permitting radial movement of the backing plate 14, anti rotation lugs engaging in radial slots may be provided between the backing plate and seal body or support plate. In the interests of clarity these have not been shown. It will also be appreciated that other means can be used to prevent rotation of the backing plate 14.

The diameter of the radially inner bore of the backing plate 14 is only slightly greater than the diameter of the outer surface 3 of the shaft 2 such that there is only a very small clearance c between the radially inner peripheral edge 22 of the backing plate 14 and the shaft outer surface 3. Conventionally the clearance between the backing plate needs to be sufficient to accommodate radial movement of the shaft 2 without the backing plate contacting the backing ring 14. However since the backing ring 14 is radially movable the clearance c now only needs to be sufficient to accommodate centrifugal and thermal growth of the shaft and consequently can be much smaller. Typically in gas turbine brush seal applications the clearance between a fixed backing ring and the shaft 2 is between 1 to 2 mm cold reducing by 0.2 mm at operating temperature, whereas with the movable backing ring 14 clearances below 1 mm down to close to the shaft outer diameter at operating conditions can be used. By reducing the clearance c the leakage flow through the seal 9 is reduced and the seal 9 performance is improved giving a significant reduction in leakage flow over a conventional fixed backing ring brush seal with a 1 to 2 mm clearance.

In the embodiment shown in FIG. 1, at the radially inner extent 22 of the backing ring 14 there is a circumferential flange 24 which extends in an axially downstream direction generally parallel to the shaft outer surface 3. The flange 24 defines an enlarged foot on the backing ring 14 and provides an enlarged radially inner peripheral surface 26 to the backing plate 14 of a increased area. This inner peripheral surface 26 is separated from the shaft outer surface 3 by the very small clearance c.

In operation fluid will leak and flow from the high pressure region 6 to the lower pressure region 8 along the shaft 2 within the clearance c between inner peripheral surface 26 of the backing plate 14 and the shaft outer surface 3. The enlarged surface area of the inner peripheral surface 26 of the backing plate and the small clearance c cause a cushion of air to be generated between the inner peripheral surface 26 and the shaft outer surface 3. The backing plate 14 will float radially on this cushion of air; an aerodynamic phenomenon know as air riding in which the inner surface 26 is not only lifted away from the outer shaft surface 3 but is also sucked radially inwardly towards to shaft outer surface 3 to maintain an equilibrium minimum clearance c therebetween. The air riding maintains the small clearance c even during radial movement of the shaft 2. Contact between the backing plate 14 and the shaft 2 is thereby avoided, or reduced, and is not required in order to radially move the backing plate 14 as is the case with conventional movable backing plate brush seals. Wear of the backing plate 14 and shaft 2 is also avoided or reduced. Consequently seal performance does not deteriorate as rapidly as with conventional brush seals in which wear increases the clearance c between the backing plate 14 and shaft 2. Damage to the shaft 2 through such wear, which in extreme cases with conventional seals can lead to shaft 2 failure, is also reduced or avoided.

An alternative embodiment of the present invention is shown in FIG. 3. The seal 9a is generally similar to the seal 9 shown in FIG. 1 and like reference numerals have been used for like features. In this embodiment however no flange 24 is provided on the backing plate 14a. Instead a recess 30 is defined within the radially inner periphery 22a of the backing plate 14a by upstream and downstream backing plate recess walls 31, 32. The recess 30 circumscribes the inner periphery 22a of the backing plate 14a with an open side of the recess 30 facing radially inwardly towards the outer surface 3 of the shaft 2. In operation the recess 30 traps some of air leaking between the shaft 2 and backing plate 14a. This creates an air cushion between the inner the backing plate 14a and the shaft outer surface 3 with the backing plate 14a air riding adjacent to the shaft outer surface 3. In a similar way to the embodiment shown in FIG. 1 air riding of the backing plate 14a maintains the clearance c between the backing plate 14a and the shaft surface 3. To further promote air riding of the backing plate 14a a duct 21 may be provided within the backing plate, 14a to supply pressurised air from the chamber 18 defined by the support plate 16 to the recess 30. Alternatively a duct may directly interconnect the recess 30 with the upstream region 6, albeit through the bristles 10.

Figure 5:
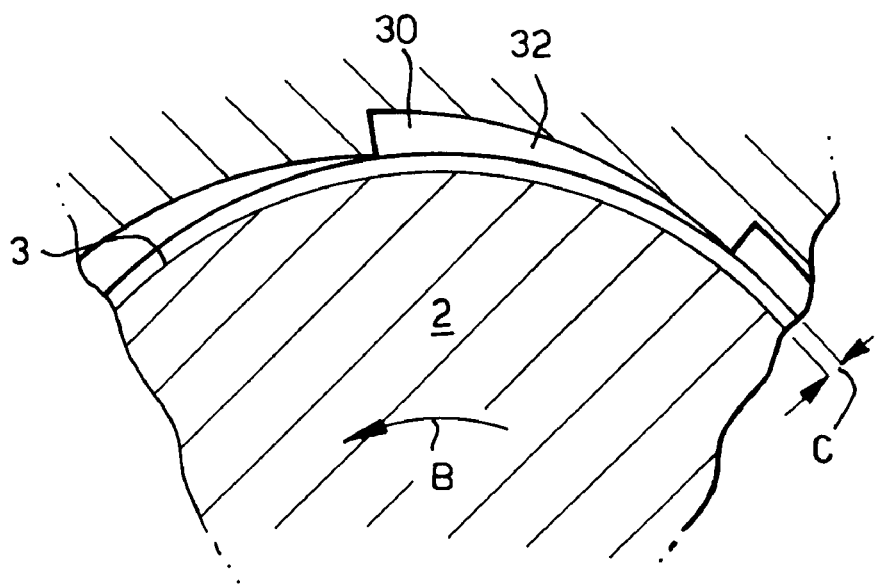
FIG. 5 is a section along line X—X, in a plane perpendicular to the rotational axis, through the part of the radially inner portion of the backing plate shown in FIG. 3.

The recess 30 defined in the radially inner periphery 22a of the backing plate 14a may be divided circumferentially to form a number of pockets rather than a single circumferential recess 30. To further enhance air riding the radial depth d of the recess 30 or pockets may vary circumferentially as shown in FIG. 5. Over the circumferential length of sectors of the circumference of the plate 14a, or over the circumferential length of the individual pockets, the radial depth d of the recess 30 may increase gradually, in the direction of rotation B of the shaft 2, to a maximum.

It will be appreciated that in other embodiments the inner periphery 22a of the plate 14 may be profiled or shaped in different ways in order to promote air riding of the plate.

In operation the bristles 10 are forced against the backing plates 14 by the pressure difference between the upstream 6 and downstream 8 regions and the backing plate 14 provides axial support for the bristles 10. The load between the bristles 10 and the backing plate 14 may however restrict and impede radial movement of the backing plate 14. To overcome this problem a radially outer portion 15 of the face of the backing plate 14c facing the bristles 10 may be recessed and spaced axially from the bristles as shown in FIG. 4. A cavity 19 is then defined between the face of the backing plate 14c and the bristles 10 with the bristles 10 contacting and being supported by only a small portion of the backing plate 14c. A duct 17 may also be provided and defined within the backing plate 14c. The duct 17 interconnects the cavities 18, 19 on either side of the backing plate 14c and supplies pressurised air to the backing plate cavity 19. The pressure in both cavities 18, 19 will be similar and is substantially the same as the upstream pressure P1. This has the affect of reducing the pressure differential across the bristles 10 which reduces the load between the bristles 10 and the backing plate 14c. Recessing of the backing plate and supplying pressurised fluid to the cavity 19 is described in EP 0,778,431 albeit in relation to a fixed backing plate. As described in that patent a further advantage, which is also present in the seal 9c shown in FIG. 4, is that radial movement and flexibility of the bristles 10 is enhanced so reducing bristle 10 wear.

In all of these embodiments the inner peripheral surface of the backing ring and the outer surface 3 of shaft 2 are preferably made as smooth as possible in order to promote air riding of the backing plate.

It will be appreciated that in all of these embodiments the backing plate 14 may be segmented with a number of individual abutting segments making up a complete annular backing plate assembly. The individual segments would be able to move radially independently of each other but would be held arch bound to prevent the assembly collapsing in below a minimum diameter, for example the shaft 2 diameter. Air riding of the individual segments will maintain a minimum clearance between the radially inner edge of the segments and the outer shaft surface 3 with the air riding to a certain degree preventing the segments from moving too far radially outwards. By segmenting the backing plate 14 inadvertent build up of hoop stresses due to thermal effects which may buckle or otherwise damage the backing plate is avoided. In addition the individual segments will move radially more easily than movement of the solid complete backing plate. A segmented backing plate will therefore be more responsive.

Although in all of the embodiments described above an air riding backing plate 14 is described it will be appreciated that the arrangement could be reversed with the backing plate 14 becoming a air riding front plate. This would have the advantage that the bristles 10 would be forced away from the radially movable plate and so the would be free to move radially more easily.

We claim:

1. A brush seal comprising a plurality of bristles packed together in a bristle layer with the bristles mounted on and extending from a first component towards a facing surface of a second component, and a movable plate disposed substantially parallel to the bristles and adjacent to the bristle layer, the plate being movable relative to the bristle layer in a direction parallel to the bristle layer, the movable plate and an edge of the movable plate adjacent to and facing the facing surface of the second component are arranged to, in use, air ride on the facing surface of the second component in which the edge of the movable plate adjacent to the second component comprises an enlarged foot member which extends from the remainder of the movable plate so as to define an enlarged surface substantially parallel to and facing the facing surface of the second component.

2. A brush seal as claimed in claim 1 in which a chamber is defined between the movable plate and the bristle layer.

3. A brush seal as claimed in claim 1 in which, in use, pressurised fluid is arranged to be supplied to between a region between the movable plate and the bristle layer.

4. A brush seal comprising a plurality of bristles packed together in a bristle layer with the bristles mounted on and extending from a first component towards a facing surface of a second component, and a movable plate disposed substantially parallel to the bristles and adjacent to the bristle layer, the plate being movable relative to the bristle layer in a direction parallel to the bristle layer, the movable plate and an edge of the movable plate adjacent to and facing the facing surface of the second component are arranged to, in use, air ride on the facing surface of the second component, in which the edge of the movable plate adjacent to the second component is profiled so as to promote air riding of the movable plate adjacent to the facing surface of the second component, said edge including at least one recess and sloping wall to provide an air cushion.

* * * * *